(12) United States Patent
Kowkutla et al.

(10) Patent No.: US 12,132,386 B2
(45) Date of Patent: Oct. 29, 2024

(54) INTEGRATED CIRCUIT WITH LOW POWER MODE MANAGEMENT

(71) Applicant: Texas Instruments Incorporated, Dallas, TX (US)

(72) Inventors: Venkateswar Kowkutla, Allen, TX (US); Kazunobu Shin, Plano, TX (US); Venkateswara Pothireddy, Mckinney, TX (US); Siva Kothamasu, Frisco, TX (US); John Apostol, Richardson, TX (US); Raghavendra Santhanagopal, Mckinney, TX (US); Rajagopal Kollengode Ananthanarayanan, Plano, TX (US); Rejitha Nair, Southlake, TX (US); Charles Gerlach, Dallas, TX (US); Ravi Teja Reddy, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 6 days.

(21) Appl. No.: 18/160,308

(22) Filed: Jan. 27, 2023

(65) Prior Publication Data
US 2023/0238872 A1 Jul. 27, 2023

Related U.S. Application Data

(60) Provisional application No. 63/303,548, filed on Jan. 27, 2022.

(51) Int. Cl.
*H02M 3/04* (2006.01)
*H02M 1/00* (2006.01)

(52) U.S. Cl.
CPC ........... *H02M 1/0032* (2021.05); *H02M 3/04* (2013.01)

(58) Field of Classification Search
None
See application file for complete search history.

(56) References Cited

U.S. PATENT DOCUMENTS 9,471,140 B2 * 10/2016 Shin ...................... G06F 1/3287

OTHER PUBLICATIONS

Kowkutla, Pushing Low Power Limits on Multi-Core High Performance SoC, 23rd International Symposium on Quality Electronic Design (ISQED), Apr. 6-7, 2022, pp. 1-4, Santa Clara, California.

* cited by examiner

*Primary Examiner* — Jeffrey S Zweizig
(74) *Attorney, Agent, or Firm* — Brian D. Graham; Frank D. Cimino; Xianghui Huang

(57) ABSTRACT

In described examples, an integrated circuit (IC) includes an isolation, an input/output (IO), and a low power mode (LPM) control logic. The isolation includes a level shift with pull-down configured to weakly pull down the voltage of signals that travel through the isolation. The IO includes an input and a physical connector for coupling to a power management IC. The IO provides an asserted-low LPM enable signal to the physical connector in response to the IO input. An output of the LPM control logic is coupled via the isolation to the input of the IO. The LPM control logic provides a high voltage signal to the input of the IO as a default during power on reset (POR) of the IC. The pull-down pulls the LPM enable signal voltage to the asserted low voltage in response to a voltage of the LPM enable signal falling below a threshold.

20 Claims, 11 Drawing Sheets

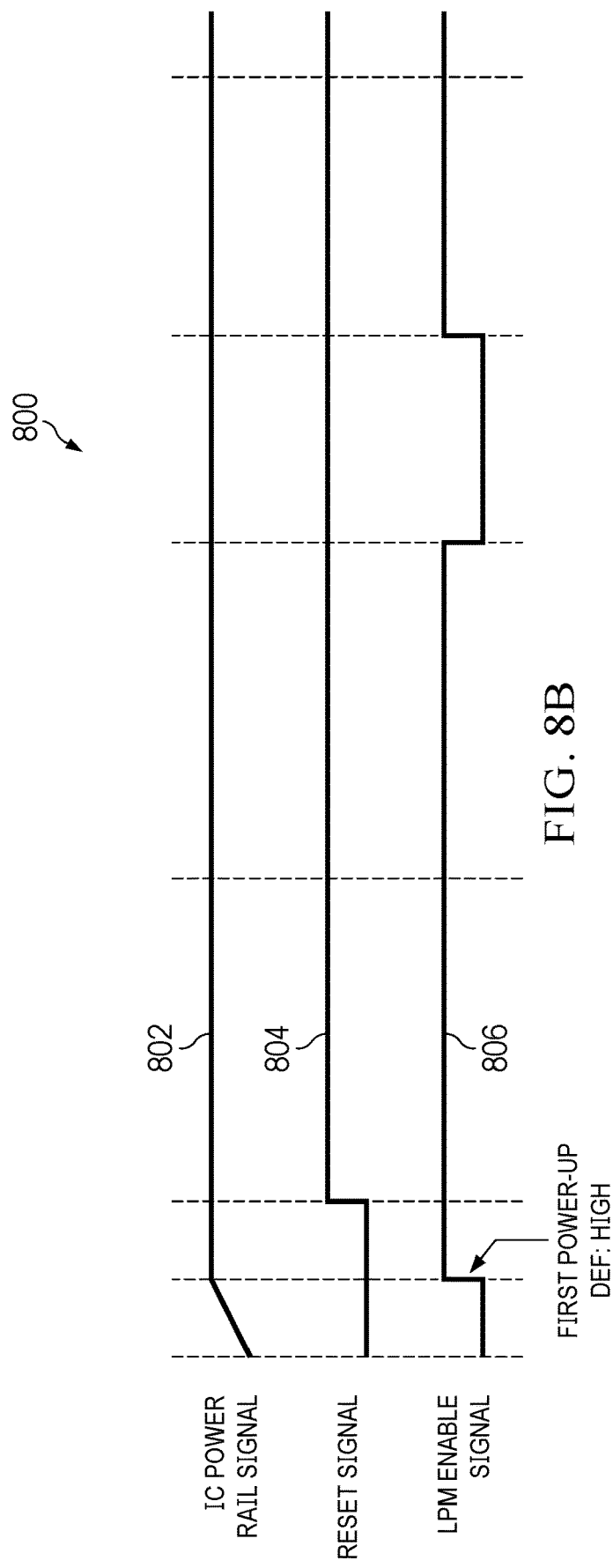

US 12,132,386 B2

INTEGRATED CIRCUIT WITH LOW POWER MODE MANAGEMENT

CROSS-REFERENCE TO RELATED APPLICATION

This application claims the benefit of and priority to U.S. Provisional Application No. 63/303,548, filed Jan. 27, 2022, which is incorporated herein by reference.

TECHNICAL FIELD

This application relates generally to integrated circuit (IC) power management, and more particularly to managing multiple low-power modes.

BACKGROUND

Various devices use low power modes to conserve power. Different applications may have different power conservation requirements. Familiar examples include sleep, hibernation, and shutdown modes in desktop and laptop computers. Different shutdown modes can correspond to different portions of a device having functionality disabled or switched to a low power functionality that is distinct from or reduced with respect to full power functionality.

SUMMARY

In described examples, an integrated circuit (IC) includes an isolation, an input/output (IO), and a low power mode (LPM) control logic. The isolation includes a level shift with pull-down configured to weakly pull down the voltage of signals that travel through the isolation. The IO includes an input and a physical connector for coupling to a power management IC. The IO provides an asserted-low LPM enable signal to the physical connector in response to the IO input. An output of the LPM control logic is coupled via the isolation to the input of the IO. The LPM control logic provides a high voltage signal to the input of the IO as a default during power on reset (POR) of the IC. The pull-down pulls the LPM enable signal voltage to the asserted low voltage in response to a voltage of the LPM control logic output falling below a threshold.

BRIEF DESCRIPTION OF THE DRAWINGS

FIG. 8B is another example timing diagram for operating the IC of FIG. 1, including device power-up and entry into normal operation and transition into sleep mode, followed by return to normal operation.

DETAILED DESCRIPTION

In some examples, an IC 102 (FIG. 1) is provided that may be used in different combinations with a power management ICs (PMICs) to control different low power modes (LPMs). A single pin of the IC 102 (see FIGS. 2A, 2B, LPM enable pin 212) can be used to output an LPM Enable Signal that has different meanings in different configurations with the PMIC 202. For example, the single pin can be used to enable a relatively lower power and slower recovery LPM (FIG. 2A), or enable a relatively higher power but faster recovery LPM (FIG. 2B). Using a single pin can reduce the total number of pins and improve IC 102 versatility, enabling use of a single IC 102 design in a variety of systems with significantly different LPM power budgets. See, for example, disclosure with respect to FIGS. 2A and 2B.

In some examples, a PMIC 202 LPM control pin (see FIG. 2A, retention mode enable pin 216) causes the PMIC 202 to deactivate—power down to an off state—if the LPM control pin is driven low by the LPM Enable Signal from the IC 102. After the PMIC 202 receives the low voltage signal at the LPM control pin, the PMIC 202 sends a Reset Signal to the IC 102 to initiate a power on reset (POR) (see FIG. 2A, reset pin 220, and POR pin 214). The Reset Signal is asserted at a low voltage, and deasserted at a high voltage. POR causes signals generated by the IC 102 to return to default values. In some examples, the IC 102 defaults to driving the LPM control pin high. This means that an LPM Enable Signal value (high) generated as part of entering the LPM, and powering down the PMIC 202 causes the voltage at the LPM control pin to indicate that the PMIC 202 should be powered on. To prevent this signal conflict from causing a control glitch, the PMIC 202 suppresses sampling the LPM control pin for a period after the PMIC 202 sends the Reset Signal.

Figure 2A:
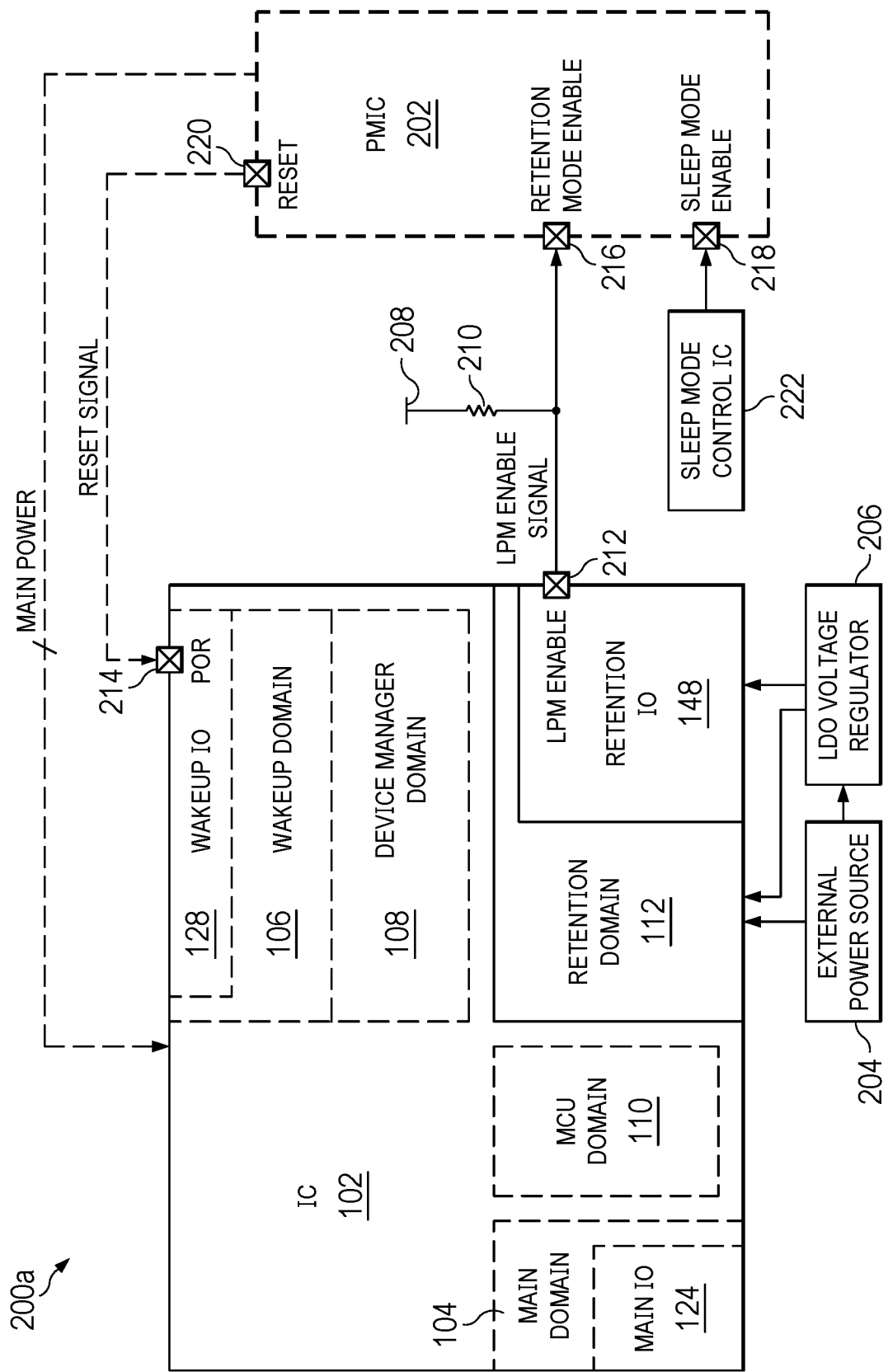
FIG. 2A is a functional block diagram of an example system in which the IC of FIG. 1 is connected to control a power management IC to enter into and exit from retention mode.

Further, the IC 102 includes pull-down in an isolation circuit 116 between circuits in a device management domain and circuits in a low power function retention domain that are powered by an external source other than the PMIC 202 (see FIG. 2A, external power source 204). This pull-down returns the LPM Enable Signal to the activated, low voltage state after the power provided by the PMIC 202 falls below a threshold (a logic voltage threshold). Below the threshold, the pull-down of the isolation circuit 116 is stronger than the drive of the circuits in the device management domain pulling the LPM Enable Signal up. See, for example, disclosure with respect to FIGS. 4 and 8A.

Figure 1:
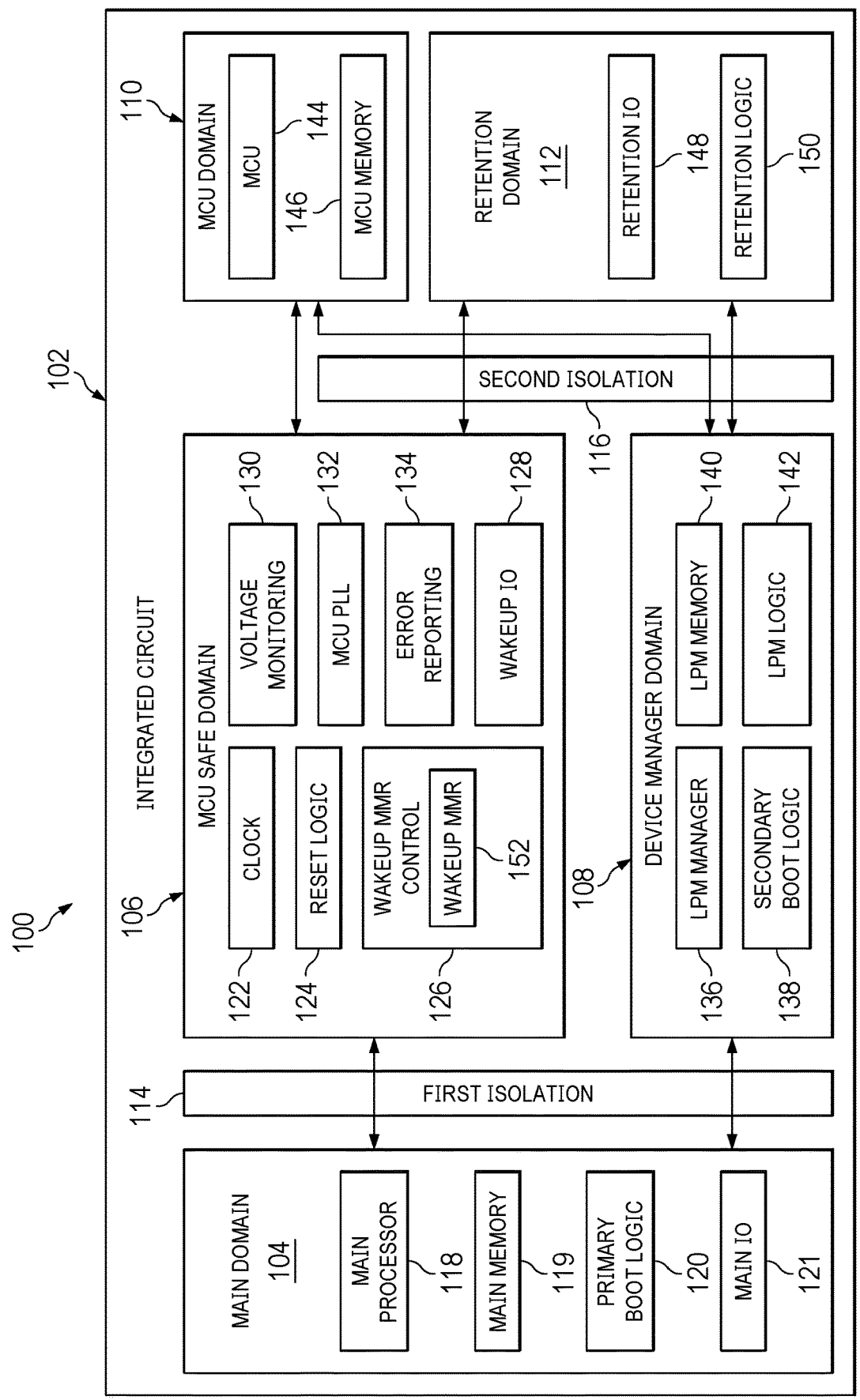
FIG. 1 is a functional block diagram of an example IC with low power mode logic.
Figure 2B:
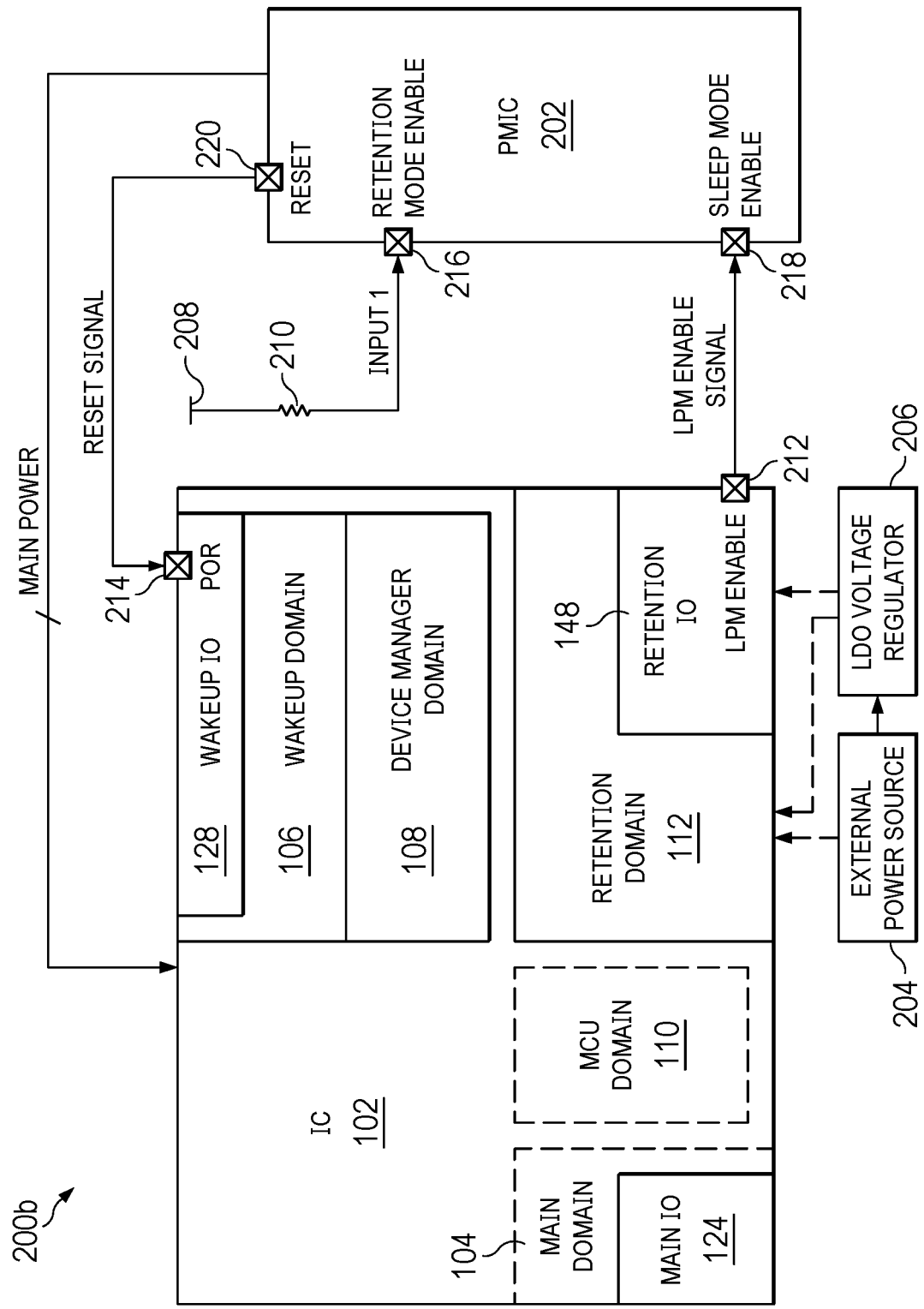
FIG. 2B is a functional block diagram of the example system in which the IC of FIG. 1 is connected to control a power management IC to enter into and exit from sleep mode.

FIG. 1 is a functional block diagram 100 of an example IC 102 with low power mode logic. The IC 102 includes multiple domains. Different domains can include one or multiple power domains. The IC 102 includes a main domain 104, a wakeup domain 106 (also referred to as a microcontroller unit (MCU) safe domain) 106, a device manager domain 108, an MCU domain 110, a retention domain 112, a first isolation circuit 114, and a second isolation circuit 116. The main domain 104 includes a main processor 118, a main memory 119, a primary boot logic 120, and a main input/output (IO) 121. The wakeup domain 106 includes a clock 122 (in some examples, multiple clocks 122), a reset logic 124, a wakeup memory mapped register (MMR) control 126, a wakeup IO 128, voltage monitoring 130, an MCU phase locked loop (PLL) 132, and error reporting 134. The MCU domain 110 includes an MCU 144 and an MCU memory 146. The retention domain 112 includes a retention IO 148 and retention logic 150. The wakeup MMR control 126 includes a wakeup MMR 152 (a memory).

The main domain 104 communicates with the wakeup domain 106 and the device manager domain 108 via the first isolation circuit 114. The wakeup domain 106 communicates with the MCU domain 110, and communicates with the retention domain 112 via the second isolation circuit 116. The device manager domain 108 communicates with the MCU domain 110 and the retention domain 112 via the second isolation circuit 116. In some examples, the first and second isolation circuits 114 and 116 include level shifters.

FIGS. 2A and 2B illustrate connections for the retention and sleep modes, respectively. FIG. 2A is a functional block diagram of an example system 200*a* in which the IC 102 of FIG. 1 is connected to control the PMIC 202 to enter into and exit from retention mode. FIG. 2B is a functional block diagram of the example system 200*b* in which the IC 102 of FIG. 1 is connected to control the PMIC 202 to enter into and exit from sleep mode. In general, the ICs 102 and PMICs 202 of both systems are substantially identical but are connected differently. Therefore, the example systems 200*a* or 200*b* are numbered to indicate views of different connection configurations in a system 200. In the illustrated examples, the PMIC 202 has different inputs, each configured to select a different low power mode, while the IC 102 has a single output (LPM enable pin 212) configured to select between the low power modes. Accordingly, different connections between the IC 102 and the PMIC 202 enable control by the IC 102 of different LPMs: the system 200*a* enables a first LPM (retention mode), and the system 200*b* enables a second LPM (sleep mode). Further, dotted lines or dotted blocks are used selectively to indicate a lack of signal along a dotted line, or a lack of power within a dotted functional block, as occurring in the LPM enabled by the respective system 200*a* or 200*b*.

In retention mode the IC 102 powers most of its functional blocks off, and controls the PMIC 202 to power off. Retention mode is a relatively lower power LPM that enables a relatively slower recovery to fully powered, normal operation. In an example, in normal operation the IC 102 draws 2.0 to 2.5 W (Watts), while in retention mode the IC 102 draws less than 600 microWatts (μW). Sleep mode is an LPM in which the IC 102 partially powers itself down (to a lesser extent than in retention mode), and controls the PMIC 202 to draw less power from a system power source. Sleep mode is a relatively higher power LPM that enables a relatively faster recovery to fully powered, normal operation. In an example, in normal operation the IC 102 draws 2.0 to 2.5 W, while in sleep mode the IC 102 draws 2 to 7 milliWatts (mW), corresponding to 0.58 mA at 12 V.

The system 200, either as the example 200*a* in FIG. 2A or 200*b* in FIG. 2B, includes an external power source 204, a low dropout (LDO) voltage regulator 206, a low voltage source 208, and a resistor 210. The retention IO 148, in the IC 102, includes an LPM enable pin 212. The wakeup IO 128 includes a POR pin 214. The LPM enable pin 212 and POR pin 214 are, for example, pins, pads, or other physical connectors for communication between the IC 102 and devices external to the IC 102.

The PMIC 202 includes a retention mode enable pin 216, a sleep mode enable pin 218, and a reset pin 220. The retention mode enable pin 216, sleep mode enable pin 218, and reset pin 220 are, for example, pins, pads, or other physical connectors for communication between the PMIC 202 and devices external to the PMIC 202. The reset pin 220 of the PMIC 202 is connected to provide a Reset Signal to the POR pin 214 of the IC 102. Interaction between POR and retention mode is further described with respect to FIGS. 4, 7, and 8A. The PMIC 202 is connected to provide power to the various domains of the IC 102 using multiple power lines collectively labeled Main Power. In some examples, a single power line is used as Main Power. In some examples, the sleep mode enable pin 218 is tied to a constant voltage source (not shown) that forces sleep mode to remain deactivated throughout operation of the system 200*a*. In some examples, this constant voltage can be implemented similarly to the pull-up configuration connected to the retention mode enable pin 216 as described below with respect to FIG. 2B. In some alternative examples, the sleep mode enable pin 218 is left unconnected, or is remapped to a different function, such as general purpose IO. In other alternative examples (see FIG. 2A), the system 200*a* includes a sleep mode control IC 222 connected to the sleep mode enable pin 218 to control activation and deactivation of sleep mode.

The retention IO 148 is connected to send an LPM Enable Signal to the PMIC 202 using the LPM enable pin 212. Connecting the LPM enable pin 212 to the retention mode enable pin 216 (FIG. 2A) enables the IC 102 to control PMIC 202 retention mode behavior, and connecting the LPM enable pin 212 to the sleep mode enable pin 218 (FIG. 2B) enables the IC 102 to control PMIC 202 sleep mode behavior. Accordingly, the LPM Enable Signal can be used to enable and disable either sleep mode or retention mode, depending on whether the LPM enable pin 212 on the IC 102 is connected to the retention mode enable pin 216 or the sleep mode enable pin 218 on the PMIC 202. This means that the single LPM enable pin 212 can be used to control LPM behavior in different applications with different LPM requirements. This reduces IC 102 pin (or other physical connector) use, reduces IC 102 area usage for LPM management, and enables systems including the IC 102 to avoid using glue logic to connect the IC 102 to the PMIC 202.

In an example, the LPM Enable Signal is active low, that is, it is generated so that an ENABLE value (a logical zero value) activates a relatively low voltage mode: either retention mode or sleep mode, depending on connectivity. A /ENABLE (not ENABLE) value (a logical one value), indicating normal operation of the IC 102, corresponds to a relatively high voltage. Accordingly, the PMIC 202 of FIG. 2A enables retention mode if the retention mode enable pin 216 receives the ENABLE value, and disables retention mode if the retention mode enable pin 216 receives the /ENABLE value. Similarly, the PMIC 202 of FIG. 2B enables sleep mode if the sleep mode enable pin 218 receives the ENABLE value, and disables sleep mode if the sleep mode enable pin 218 receives the /ENABLE value.

Referring to the system 200*a* of FIG. 2A, the LPM enable pin 212 is connected to the retention mode enable pin 216 and a first terminal of the resistor 210. The low voltage source 208 is connected to a second terminal of the resistor 210. The external power source 204 is connected to provide power to the retention domain 112. The external power source 204 is also connected to provide power via the LDO voltage regulator 206 to the retention domain 112 and the retention IO 148. The external power source 204 directly and indirectly provides a relatively low level of power to the retention domain 112 during normal operation, and provides sufficient power to the retention domain 112 to sustain retention mode operations while retention mode is active. The external power source 204 can be powered by a system power source, such as a car battery.

The low voltage source 208 weakly pulls up the voltage at the retention mode enable pin 216, so that the default value received by the retention mode enable pin 216 is /ENABLE. This helps to avoid reliability issues during power-on, power-off, and other periods of IC 102 operation during which signal response is noisy or otherwise nonlinear. However, because the low voltage source 208 provides a weak pull-up, if the LPM enable pin 212 outputs the LPM Enable Signal with the ENABLE value then the default value (/ENABLE) is overridden and the retention mode enable pin 216 receives the ENABLE value.

During the FIG. 2A retention mode, the PMIC 202 turns off and, as shown by the dotted line by Main Power, the PMIC 202 does not provide power to the IC 102. Accordingly, the main domain 104, the MCU domain 110, and the device manager domain 108 are turned off; the external power source 204 provides power to the retention domain 112 (directly and via the LDO voltage regulator 206); and the retention IO 148 uses daisy chain mode, which is a low power mode further described with respect to FIG. 4. In some examples, retention mode is used in automotive applications, such as when the ignition is turned off so that the automobile is generally powered off. The IC 102 continues to operate in a very low power mode, monitoring signals from external events such as sensors and other devices. The IC 102 deactivates retention mode to return to normal operation in response to wakeup-triggering events, such as a key fob being used to unlock a car door. Retention mode is further discussed with respect to FIGS. 4 through 7 and 8A.

Referring to the system 200b of FIG. 2B, during sleep mode, internal switches of the main domain 104 and the MCU domain 110 switch the main domain 104 and the MCU domain 110 into a power-off mode, while power provided to other functional blocks is reduced. In some examples, sleep mode is used in security operations, such as to conserve power to security cameras. For example, normal operation can be quickly resumed to restore full functionality if low-resolution monitoring detects movement. Sleep mode is further discussed with respect to FIGS. 4, 5, and 8B.

In the system 200b of FIG. 2B, the LPM enable pin 212 is connected to the sleep mode enable pin 218. The sleep mode enable pin 218 is pulled up during normal operation of the IC 102 and the PMIC 202. Meanwhile, the low voltage source 208 is connected to the second terminal of the resistor 210, and the first terminal of the resistor 210 is connected to the retention mode enable pin 216, thereby providing sufficient voltage to the retention mode enable pin 216 so as to prevent the PMIC 202 from entering the retention mode. Power connections from the external power source 204 and the LDO voltage regulator 206 to the retention domain 112 and the retention IO 148 are shown as dotted lines to indicate non-connection, that is, while power from those sources is not provided (or required), while the sources may readily power other blocks outside the IC 102 but not otherwise shown. In some examples in which the LPM enable pin 212 is not connected to the retention mode enable pin 216, provision of external power to the retention domain 112 is unnecessary because the PMIC 202 remains on during normal operation and during sleep mode.

Figure 3A:
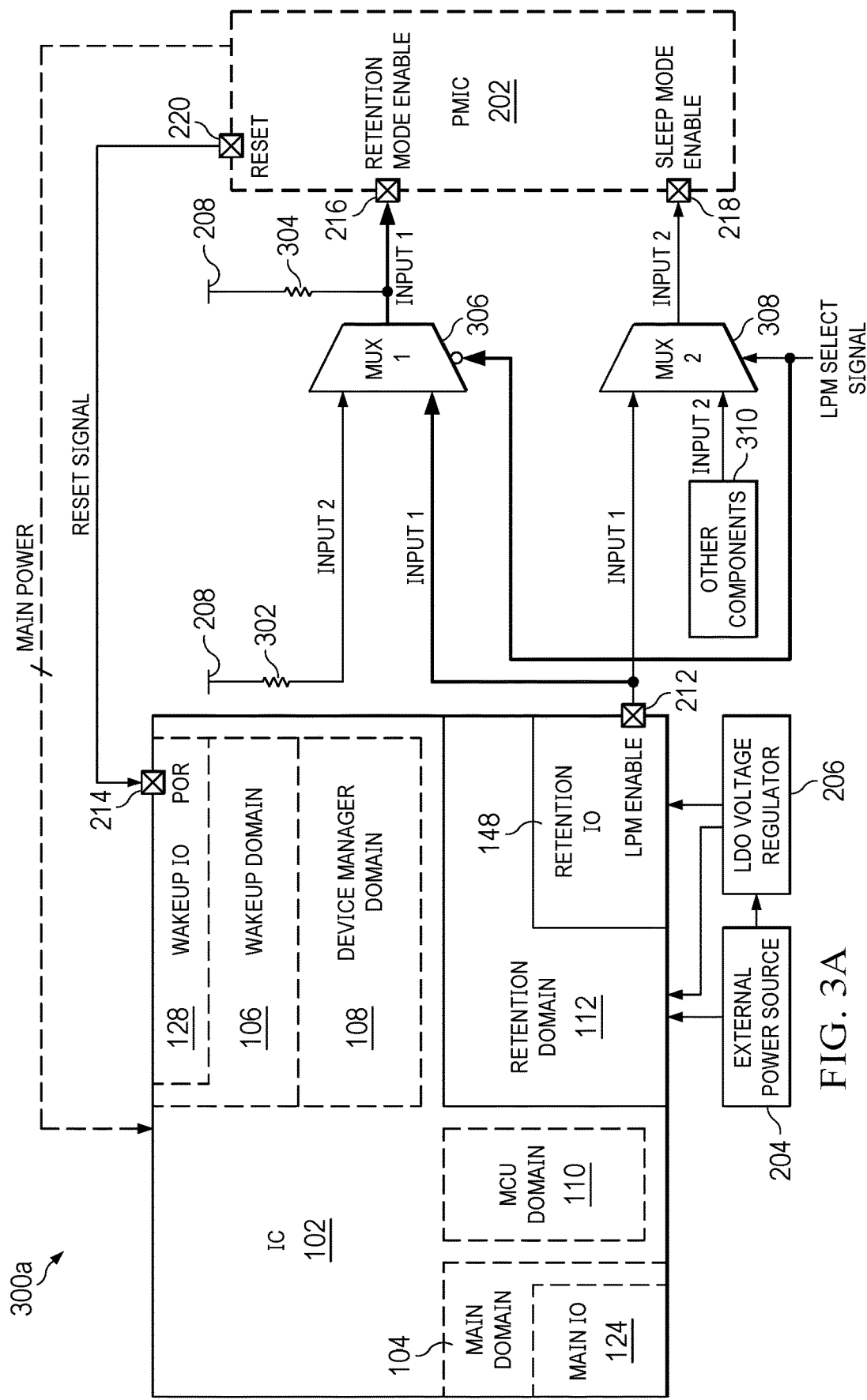
FIG. 3A is a functional block diagram of an alternative example system including the IC of FIG. 1 and illustrating an example retention mode.
Figure 3B:
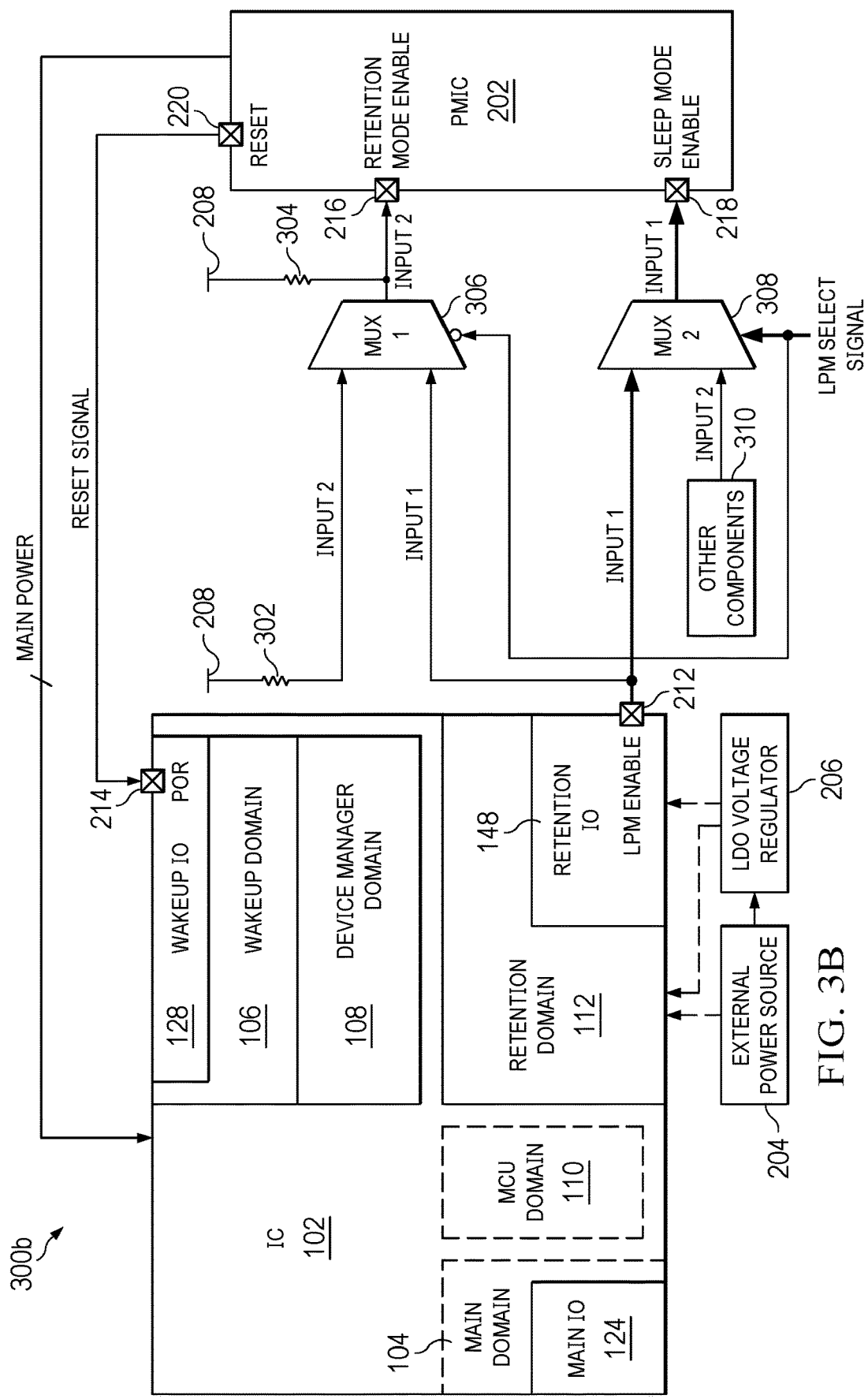
FIG. 3B is a functional block diagram of the alternative example system including the IC of FIG. 1 and illustrating an example sleep mode.

FIG. 3A is a functional block diagram 300a of an alternative example system 300 including the IC 102 of FIG. 1 and illustrating an example retention mode. FIG. 3B is a functional block diagram 300b of the alternative example system 300 including the IC 102 of FIG. 1 and illustrating an example sleep mode. Diagrams 300a and 300b are views of different activity in the same system 300. The system 300 includes glue logic to enable the IC 102 to control entry into both retention mode and sleep mode (at different times) in a single application. In addition to the IC 102 and the PMIC 202 as described with respect to FIGS. 2A and 2B, the system 300 also includes a first resistor 302, a second resistor 304, a first multiplexer (MUX 1) 306, a second multiplexer (MUX 2) 308, and other components 310 (such as other ICs, sensors, or circuit board components).

The retention IO 148 is connected to send an LPM Enable Signal to the PMIC 202 using the LPM enable pin 212. The LPM enable pin 212 is connected to a first input (input 1) of the first multiplexer 306 and a first input (input 1) of the second multiplexer 308. An LPM Select Signal is received by an inverted control input of the first multiplexer 306, and by a non-inverted control input of the second multiplexer 308. This means that if the LPM Select Signal has a first logical value, the first multiplexer 306 outputs its first input and the second multiplexer 308 outputs its second input. Similarly, if the LPM Select Signal has a second logical value, the first multiplexer 306 outputs its second input and the first multiplexer 308 outputs its first input.

The low voltage source 208 is connected to a first terminal of the first resistor 302 and a first terminal of the second resistor 304. A second terminal of the first resistor 302 is connected to a second input (input 2) of the first multiplexer 306. An output of the first multiplexer 306 is connected to a second terminal of the second resistor 304 and to the retention mode enable pin 216 of the PMIC 202. The other components 310 are connected to communicate with the sleep mode enable pin 218 via the second input (input 2) of the second multiplexer 308. In some examples, the sleep mode enable pin 218 can be reconfigured to act as a general purpose IO pin if the LPM is not connected to, or selected to communicate with (by the LPM Select Signal), the sleep mode enable pin 218. An output of the second multiplexer 308 is connected to the sleep mode enable pin 218. Darker lines indicate a signal path taken by the LPM Select Signal to select a first input to enable the LPM Enable Signal to reach the PMIC 202, and a corresponding signal path taken by the LPM Enable Signal that reaches the PMIC 202. In the system 300a of FIG. 3A, the LPM Select Signal selects retention mode. In the system 300b of FIG. 3B, the LPM Select Signal selects sleep mode.

The retention mode enable pin 220 is weakly pulled high by the low voltage source 208. This means that if the LPM Enable Signal is set to /ENABLE (a logical one value) or the LPM Select Signal selects the second input of the first multiplexer 306, the retention mode enable pin 220 receives a /ENABLE value. Accordingly (similarly to the system 200 of FIGS. 2A and 2B), /ENABLE is a default LPM Enable Signal value received by the retention mode enable pin 220. If the LPM Enable Signal is set to ENABLE (a logical zero value) and the LPM Select Signal selects the first input of the first multiplexer 306, the ENABLE signal overcomes the weak pull-up by the low voltage source 208, and the retention mode enable pin 220 receives the LPM Enable Signal with the ENABLE value. If the LPM Enable Signal is set to ENABLE and the LPM Select Signal selects the first input of the second multiplexer 308, then the sleep mode enable pin 218 receives the ENABLE value.

Figure 4:
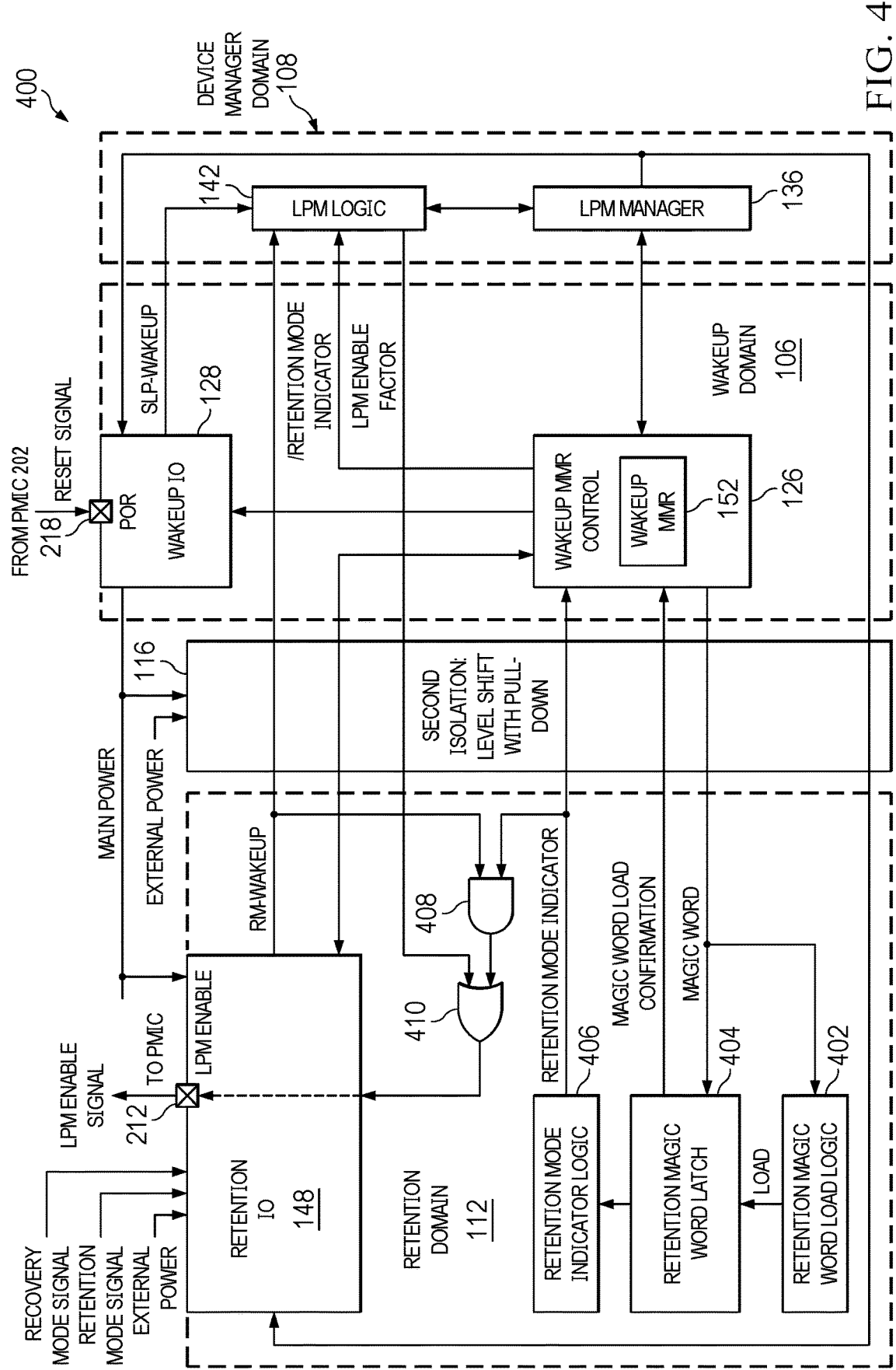
FIG. 4 is a functional block diagram of the IC of FIG. 1 with example retention mode logic.

FIG. 4 is a functional block diagram 400 of portions of the IC 102 of FIG. 1 with example retention mode logic. The functional block diagram 400 shows the wakeup domain 106, the device manager domain 108, the retention domain 112, and the second isolation circuit 116. The main domain 104 are MCU domain 110 are omitted for clarity. The second isolation circuit 116 includes level shifters with weak voltage pull-down. This weak voltage pull-down is similar to the FIGS. 2A, 2B weak pull-up that causes the LPM Enable Signal received by the retention mode enable pin 216 of the PMIC 202 to weakly default to /ENABLE. The weak voltage pull-down is powered both by the PMIC 202 and by the external power source 204, so that the pull-down remains effective during entry into retention mode and during retention mode. In addition to previously-introduced blocks, the retention domain 112 includes a retention magic word load logic 402, a retention magic word latch 404, a retention mode indicator logic 406, an AND logic gate 408, and an OR logic gate 410.

Function of the portions of the IC 102 shown in the diagram 400 is first summarized briefly. The wakeup MMR control 126 (in the wakeup domain 106) controls entry of the IC 102 and the PMIC 202 into retention mode, and the LPM manager 136 (in the device manager domain 108) controls entry of the IC 102 and the PMIC 202 into sleep mode, as further discussed with respect to FIG. 5. The LPM logic 142 determines entry into an LPM in response to signals from the wakeup MMR control 126 and the LPM manager 136. The LPM logic 142 triggers entry into an LPM by providing an LPM Enable Factor signal with an ENABLE value to the retention IO 148 via the OR logic gate 410. The LPM Enable Factor signal is, like the LPM Enable Signal, asserted at a low voltage, and deasserted at a high voltage. The wakeup MMR control 126 uses a retention mode logic 600 (see FIG. 6) to avoid accidental entry into retention mode, including by verifying conformal system behavior by comparing a stored retention magic word to the same retention magic word as generated using tie-offs (logic with inputs tied to high and low voltage rails using interconnects). The wakeup MMR control 126 also uses the retention mode logic 600 to set indicators that track entry into retention mode, and are used to set the ENABLE value of the LPM Enable Factor.

Exit from retention mode is triggered by the retention IO 148 receiving a signal corresponding to an event that indicates that the IC 102 should return to normal operation; this signal is referred to (irrespective of event type or source) as a Recovery Mode Signal. In response to the Recovery Mode Signal, the retention IO outputs an RM-Wakeup signal, which ultimately causes power on, POR and return to normal operation. Exit from sleep mode is triggered by internal signals of the IC 102, or by a signal received by the wakeup IO 128. If the latter, the wakeup IO 128 sends a SLP-Wakeup signal.

The wakeup domain 106, the device manager domain 108, and the retention domain 112 receive main power. The retention domain 112 receives external power (from the external power source 204), as well as a Retention Mode Signal and a Recovery Mode Signal.

Output of the LPM manager 136 is connected to input of the wakeup IO 128 and, via the second isolation circuit 116, the retention IO 148. The LPM manager 136 is also connected to communicate with the wakeup MMR control 126 and the LPM logic 142. The wakeup MMR control 126 outputs to the wakeup IO 128, the LPM logic 142, as well as, via the second isolation circuit 116, the retention IO 148, the retention magic word load logic 402, and the retention magic word latch 404. Output of the LPM logic 142 is connected, via the second isolation circuit 116, to a first input of the OR logic gate 410. The wakeup IO 128 outputs to the LPM logic 142. The retention IO 148 outputs to a first input of the AND logic gate 408 and, via the second isolation circuit 116, the LPM logic 142. The retention IO 148 is also connected to communicate with the wakeup MMR control 126. An output of the retention magic word load logic 402 is connected to an input of the retention magic word latch 404. The retention magic word latch 404 outputs to the retention mode indicator logic 406 and, via the second isolation circuit 116, the wakeup MMR control 126. The retention mode indicator logic 406 outputs to a second input of the AND logic gate 408 and, via the second isolation circuit 116, the wakeup MMR control 126. The AND logic gate 408 outputs to a second input of the OR logic gate 410. The OR logic gate 410 outputs to the retention IO 148.

The retention IO 148 processes the output of the OR logic gate 410 to output the LPM Enable Signal via the LPM enable pin 212. The retention IO 148 processes the output of the OR logic gate 410 to output the LPM Enable Signal with high priority. Accordingly, the IO unit of the retention IO 148 that processes the output of the OR logic gate 410 operates normally, not as part of a daisy chain, during both normal operation and retention mode operation. This is indicated by the dotted line through the retention IO 148.

An LPM Enable Factor signal output by the LPM logic 142 defaults to logical one on POR and during normal operation. Accordingly, the output of the OR logic gate 410 remains a logical one during normal operation, so that the LPM Enable Signal remains a logical one (/ENABLE) during normal operation. Behavior of the LPM Enable Factor signal during POR is further discussed below and with respect to FIGS. 7 and 8A.

Figure 5:
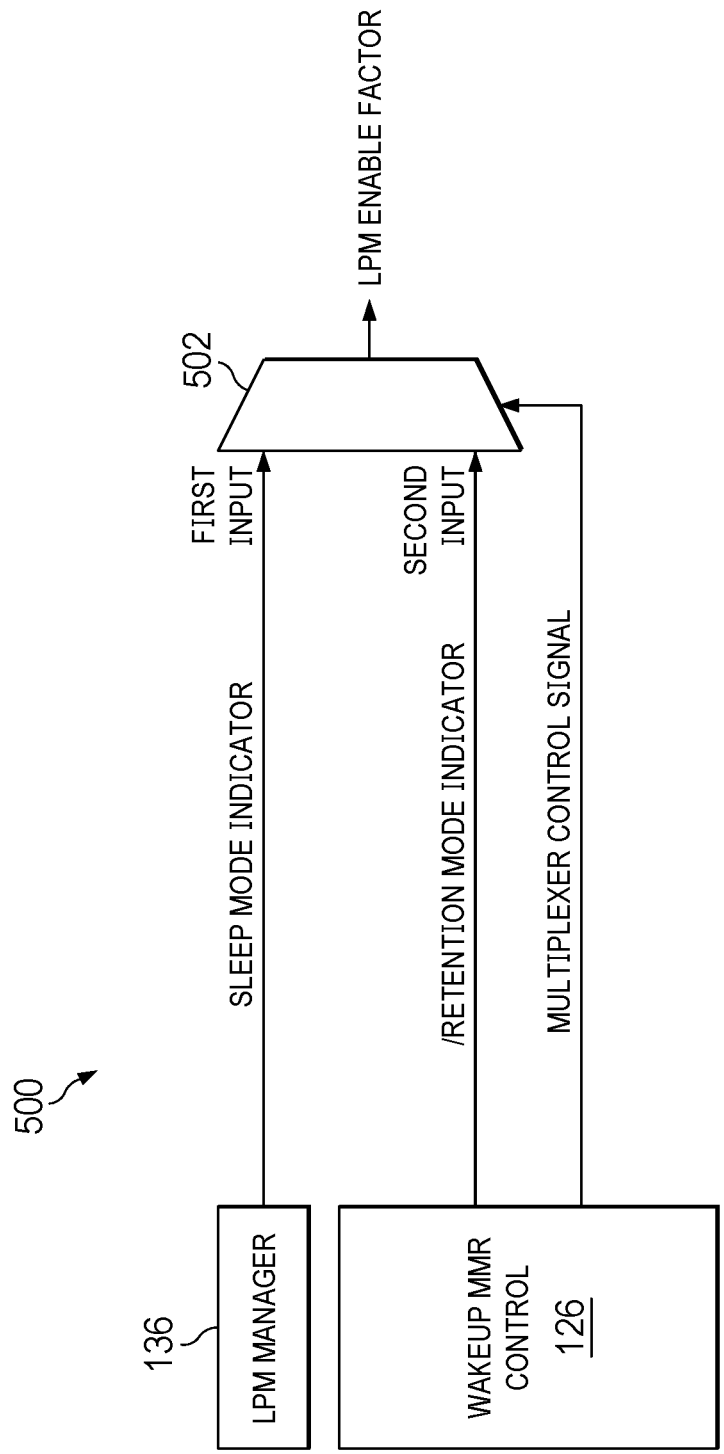
FIG. 5 is an example multiplexer system 500 for selectively providing the low power mode (LPM) Enable Factor to correspond to entry into either retention mode or sleep mode.

As further detailed in FIG. 5, the wakeup MMR control 126 provides a Multiplexer Control Signal (not shown in FIG. 4) to the LPM logic 142. The Multiplexer Control Signal is programmed to reflect whether the IC 102 is connected to another device (e.g., PMIC 202) in a manner such that the LPM Enable pin 212 controls a retention mode or a sleep mode. As described with respect to FIGS. 2A through 3B, the IC 102 can be configured to control either or both of retention and sleep modes in the PMIC 202. The wakeup MMR control 126 provides an inverted Retention Mode Indicator signal (/Retention Mode Indicator) with a logical zero value to the LPM logic 142 as part of entry into retention mode. Similarly, the LPM manager 136 provides a Sleep Mode Indicator signal (not shown in FIG. 4) with a logical zero value to the LPM logic 142 as part of entry into sleep mode. Processing of the inverted Retention Mode Indicator signal, the Multiplexer Control Signal, and the Sleep Mode Indicator is further described later.

The LPM manager 136 controls entry into and exit from sleep mode. As described above, the LPM manager 136 provides the Sleep Mode Indicator signal with the logical zero value to the LPM logic 142, which provides the LPM Enable Factor signal with the logical zero value to the retention IO 148 via the OR logic gate 410. In response, the retention IO 148 transmits the LPM Enable Signal with the ENABLE value to the PMIC 202 to trigger sleep mode. The LPM manager 136 signals the wakeup MMR control 126, which causes portions of the IC 102 to save state in the wakeup MMR 152 and reduce power or turn off. In some examples, the IC 102 can recover from sleep mode relatively quickly because the PMIC 202, the wakeup domain 106, and the device manager domain 108 retain power during sleep mode, and the IC 102 state is available in the wakeup MMR 152 and to be reloaded without POR.

During sleep mode operation of the IC 102, the wakeup IO 128 can provide an SLP-Wakeup (sleep mode wakeup) signal to the LPM logic 142. (In some examples, a signal triggering wakeup from sleep mode can also originate elsewhere in the wakeup domain 106 or in the device manager domain 108.) The LPM logic 142 responsively changes the LPM Enable Factor to a logical one, which is propagated via the OR logic gate 410 to the retention IO 148 (during sleep mode, the output of the AND logic gate 408 is a logical zero). The retention IO 148 then changes the LPM Enable Signal to a logical one, causing the PMIC 202 to return to full power. The SLP-Wakeup signal is also propagated from the LPM logic 142 to the LPM manager 136, which signals the wakeup MMR control 126 to cause powered down portions of the IC 102 to return to normal, full power operation, and causes the saved state to be reloaded from the wakeup MMR 152.

The LPM manager 136 provides configuration information to configuration registers of the wakeup IO 128 and the retention IO 148 to control LPM behavior of the IOs 128 and 148. In some examples, this configuration information includes IO direction, IO level, and pulls. In some examples, the wakeup IO 128 and the retention IO 148 can each include multiple IO units, each controlling different signals. During retention mode, the IO units in the retention IO 148 switch over, by default, to a daisy chain mode. In daisy chain mode, which (in some examples) consumes less power than normal operation, the IO units are connected in series and the retention IO 148 uses a lower power receiver and a lower power transmitter than during normal operation. In some examples, this connection in series makes processing by the retention IO 148 of some inputs and outputs during retention mode relatively slow. In some examples, during retention mode operation, pins of the IC 102 that are configured as input pins are expected to be driven by a device (or devices) external to the IC 102, and pins of the IC 102 that are configured as output pins are maintained by the retention IO 148 in a desired high, low, or undriven state. Outside retention mode, by default, the retention IO 148 operates in non-daisy chain mode.

IO direction is used to select IO units to operate in normal mode, not daisy chain mode, during retention mode operation; and also to select whether an IO unit operates in input mode or output mode. IO level is used to select pins of the IC 102 to which the retention IO 148 is programmed to apply a relatively high power pull to binary zero or binary one (0 or 1) during retention mode operation. Pulls are used to select pins of the IC 102 to which the retention IO 148 is programmed to apply a relatively low power pull to binary zero or binary one during retention mode operation. In some examples, without a specified IO level or pull, some pins of the IO 102 will output no (empty) signal during retention mode operation.

IO level and pulls are used to avoid reliability issues during power-down, power-up, and other periods of IC 102 operation during which signal response is noisy or otherwise nonlinear. In some examples, the IO direction, IO level, and pulls configuration information can be provided during POR of the IC 102. During entry into retention mode, the LPM manager 136 signals the wakeup MMR control 126 to control the wakeup IO 128 and the retention IO 148 to start using the behaviors specified by the provided configuration information. During exit from retention mode, the LPM manager 136 signals the wakeup MMR control 126 to control the wakeup IO 128 and the retention IO 148 to stop using the behaviors specified by the provided configuration information.

The retention IO 148 provides the Retention Mode Signal (received from outside the IC 102), which tells the IC 102 to signal entry into retention mode, to the wakeup MMR control 126. In response to an ENABLE value of the Retention Mode Signal, the wakeup MMR control 126 retrieves a retention magic word from memory (the wakeup MMR 152), and provides the retention magic word to the retention magic word load logic 402 and the retention magic word latch 404. The retention magic word is, for example, 32 bits long, with one bit used to cause the retention magic word latch 404 to load or unload the other 31 bits. The term "magic word" is used because the 31 bits to be loaded are selected to be difficult to generate randomly, such as during POR or transient error states. An example magic word is hexadecimal 0xAAAAAAAB (binary 1010 . . . 101011).

Once the retention magic word load logic 402 verifies the retention magic word, it provides a Load signal to the retention magic word latch 404. In response to the Load signal, the retention magic word latch 404 latches the retention magic word, provides the latch contents to the retention mode indicator logic 406, and provides a Magic Word Load Confirmation signal with a logical one value to the wakeup MMR control 126. In response to the contents of the retention magic word latch 404 matching the retention magic word, the retention mode indicator logic 406 provides a Retention Mode Indicator signal with a logical one value to the second input of the AND logic gate 408 and to the wakeup MMR control 126. The wakeup MMR control 126 causes the wakeup MMR 152 to store the Magic Word Load Confirmation signal and the Retention Mode Indicator signal with the logical one values.

In response to receiving the Magic Word Load Confirmation signal with the logical one value and the Retention Mode Indicator with the logical one value, the wakeup MMR control 126 also signals the LPM logic 142 to trigger entry into retention mode. The wakeup MMR control 126 does this by providing a logical zero—the inverse of the Retention Mode Indicator signal (/RETENTION MODE INDICATOR)—to the LPM logic 142. If the Multiplexer Control Signal (see FIG. 5) indicates that the IC 102 is configured to control retention mode in the PMIC 202, the LPM logic 142 provides the LPM Enable Factor signal with the logical zero value to the first input of the OR logic gate 410. The OR logic gate 410 outputs the LPM Enable Factor signal with the logical zero value to the retention IO 148, which outputs the LPM Enable Signal with the ENABLE (logical zero) value via the LPM enable pin 212.

The PMIC 202 receives the LPM Enable Signal with the ENABLE value at the retention mode enable pin 216, as shown in FIG. 2A (and FIG. 3A). In response, the PMIC 202 outputs a Reset Signal via the reset pin 220, and powers down to turn off; accordingly, the amount of power provided by the PMIC 202 to the IC 102 as main power decreases to zero over time. The IC 102 receives the Reset Signal at the POR pin 214 in the wakeup IO 128. The wakeup IO 128 provides the Reset Signal to the reset logic 124 (see FIG. 1), which initiates a POR. The PMIC 202 provides the Reset Signal to the IC 102 because the POR process reduces or avoids reliability issues that can be caused by low power conditions, such as different main power lines powering down at different rates, as the PMIC 202 powers down to turn off. In other words, POR acts like a safe state for the IC 102, preventing spurious behavior that can be caused by, for example, different combinations of components of the IC 102 being fully or partially turned off (by reduced power) than would be the case during normal, full power operation.

In the IC 102, the POR causes signal settings to return to defaults. This includes the LPM Enable Factor signal output by the LPM logic 142, which defaults to logical one. This logical one propagates through the OR logic gate 410 and the retention IO 148, via the LPM enable pin 218 of the IC 102, to the retention mode enable pin 216 of the PMIC 202. Accordingly, the propagated logical one could present a logical one as the LPM Enable Signal, that is, presenting a POR-caused logical one, which is the non-enabling signal (i.e., /ENABLE) for the PMIC 202 to enter retention mode. Accordingly, to prevent this POR-caused /ENABLE value of the LPM Enable Signal from causing a glitch, the PMIC 202 ignores signal changes in the retention mode enable pin 216 for a period of time after the PMIC 202 sends the Reset Signal. In some examples, the LPM Enable Signal ignore period can start contemporaneously with transmission of the Reset Signal via the reset pin 220, or between receipt by the PMIC 202 of the LPM Enable Signal with the ENABLE value and transmission of the Reset Signal. Ignoring the LPM Enable Signal corresponds to the PMIC 202 not sampling the signal (for example, voltage or current) at the retention mode enable pin 216 during the ignore period. The ignore period can be set by, for example, software, hardware, or firmware.

As the power provided by the PMIC 202 to the IC 102 decreases, the power used by the LPM logic 142 to drive the logical one value of the LPM Enable Factor signal decreases. Once the power driving the logical one value of the LPM Enable Factor signal falls below a threshold, the pull-down in the second isolation circuit 116 overcomes the logical one value of the LPM Enable Factor signal. This allows the pull-down in the second isolation circuit 116 to pull the voltage of the LPM Enable Factor signal down to a level corresponding to a logical zero value. This logical zero value propagates through the OR logic gate 410 to the retention IO 148. This causes the retention IO 148 to output the LPM Enable Signal as a logical zero (ENABLE) value, ending the potential POR-caused glitch. In an example, the pull-down threshold is reached when the main power rails of the IC 102 are powered down sufficiently that a gate-source voltage of a transistor controlling the LPM Enable Factor signal falls below a turn-on threshold voltage of the transistor. In another example, the pull-down threshold is reached when the main power rails of the IC 102 are powered down sufficiently that the LPM Enable Factor signal is driven at a sufficiently low voltage that the pull-down overcomes the LPM Enable Factor signal.

While in retention mode, the retention IO 148 monitors sensors and other system signals. The retention IO 148 is powered by the external power source 204 during retention mode to perform this monitoring. The retention IO 148 until the Recovery Mode Signal is asserted. The Recovery Mode Signal corresponds to a sensor or other system signal having a value that indicates that the IO 102 and PMIC 202 should return to normal, full power operation. In response to receiving the asserted Recovery Mode Signal, the retention IO 148 stores, in memory of the retention IO 148, information indicating the type of event corresponding to the Recovery Mode Signal, and provides the AND logic gate 408 the RM-Wakeup signal with a logical one value. For example, the retention IO 148 stores information indicating which pin of the IC 102 received the asserted Recovery Mode Signal.

In response to receiving the RM-Wakeup signal with a logical one value while the Retention Mode Indicator has the logical one value (indicating retention mode), the AND logic gate 408 outputs a logical one to the OR logic gate 410. The OR logic gate 410 forwards the logical one value to the retention IO 148. In response, the retention IO 148 outputs the LPM Enable Signal with the /ENABLE (logical one) value via the LPM enable pin 212. This causes the PMIC 202 to start powering on to a turned on state to enable normal operation, and to output the Reset Signal, via the reset pin 220, to the POR pin 218. Use of the AND logic gate 408 prevents error conditions that may arise due to wakeup signals during normal operation (or other non-retention mode operation).

Once the wakeup domain 106 receives sufficient power—after the PMIC 202 power-on process advances sufficiently—the wakeup IO 128 provides the Reset Signal to the reset logic 124, which initiates POR in the IC 102. During the boot process, the secondary boot logic 138 (FIG. 1) polls the wakeup MMR 152 to determine whether retention mode was enabled prior to the POR. Determining whether retention mode was enabled corresponds to retrieving and checking the value of the Retention Mode Indicator stored by the wakeup MMR 152. In some examples, the secondary boot logic 138 also compares the magic word load confirmation stored by the wakeup MMR 152 to an expected value to confirm the validity of operating voltages while the IC 102 was in retention mode.

If the IC 102 was in retention mode prior to the POR, the secondary boot logic 138 reads memory of the retention IO 148 to determine the type of event corresponding to the Recovery Mode Signal—for example, which pin of the IC 102 received the Recovery Mode Signal. The LPM manager 136 causes the wakeup MMR control 126 to write a word other than the retention magic word into the retention magic word latch 404 to disable retention mode. The LPM manager 136 also causes the wakeup MMR control 126 to signal the retention IO 148 and the wakeup IO 128 to return to normal operation. After the boot sequence is completed, the IC 102 returns to normal, steady state operation.

FIG. 5 is an example multiplexer system 500 for selectively providing the LPM Enable Factor to correspond to entry into either retention mode or sleep mode. The multiplexer system includes the wakeup MMR control 126, the LPM manager 136, and a multiplexer 502. A retention mode indicator output of the wakeup MMR control 126 is connected to a first input of the multiplexer 502, and a multiplexer control output of the wakeup MMR control 126 is connected to provide a Multiplexer Control Signal to a control input of the multiplexer 502. A sleep mode indicator output of the LPM manager 136 is connected to a second input of the multiplexer 502. An output of the multiplexer provides the LPM Enable Factor signal and is connected to the first input of the OR logic gate 410.

In an example, the Multiplexer Control Signal is a three bit signal. (Multiple bits are used for reliability; and in some examples, for robustness against unintended bit flips.) A binary 101 value of the Multiplexer Control Signal corresponds to selecting the second input of the multiplexer 502, corresponding to configuration for sleep mode. Binary values other than 101 correspond to selecting the first input of the multiplexer 502, corresponding to configuration for retention mode. The default value of the multiplexer control output is 000—retention mode, which corresponds to device power control. The value of the Multiplexer Control Signal can be changed after a boot process of the IC 102 is complete.

Figure 6:
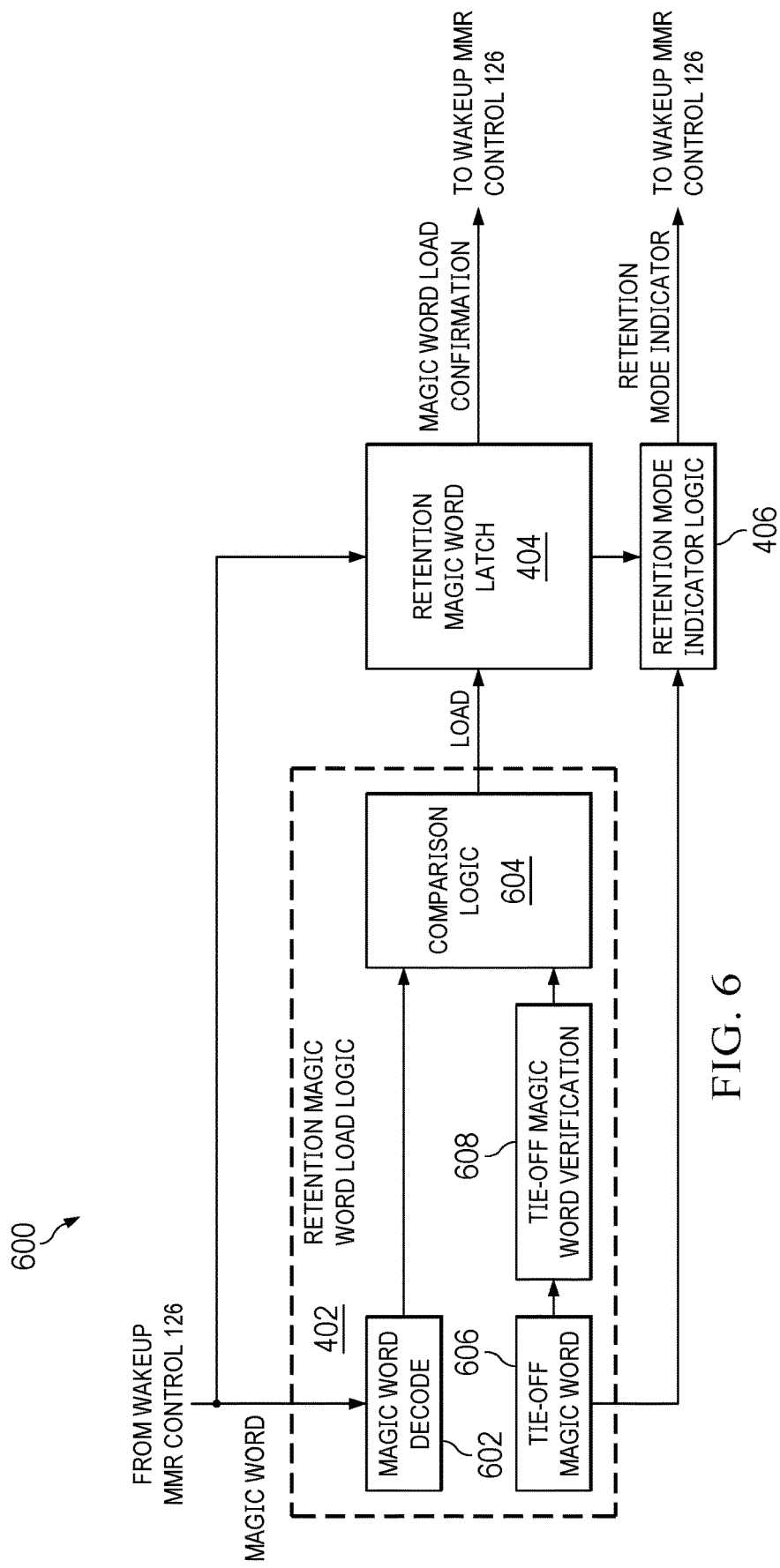
FIG. 6 is a functional block diagram of example retention mode logic.

FIG. 6 is a functional block diagram of example retention mode logic 600. The retention mode logic 600 includes the retention magic word load logic 402, the retention magic word latch 404, and the retention mode indicator logic 406. The retention magic word load logic 402 includes a magic word decode block 602, a comparison logic 604, a tie-off magic word block 606, and a tie-off magic word verification block 608. An input of the magic word decode block 602 is connected to an input of the retention magic word load logic 404. An output of the magic word decode block 602 is connected to a first input of the comparison logic 604. A first output of the tie-off magic word block 606 is connected to an input of the tie-off magic word verification block 608. An output of the tie-off magic word verification block 608 is connected to a second input of the comparison logic 604. An output of the comparison logic 604 is connected to a load input of the retention magic word latch 404.

The wakeup MMR control 126 retrieves the retention magic word from the wakeup MMR 152, and provides the retention magic word to an input of the magic word decode block 602 and to a data input of the retention magic word latch 404. In an example, the magic word decode block 602 and the tie-off magic word verification block 608 are each a combination of XOR logic gates and cascading AND logic gates. The retention magic word latch 404 outputs to the retention mode indicator logic 406. An output of the retention magic word latch 404 is connected to a first input of the retention mode indicator logic 406. A second output of the tie-off magic word 606 is connected to a second input of the retention mode indicator logic 406. The retention mode indicator logic 406 provides the Retention Mode Indicator to the AND logic gate 408 and the wakeup MMR control 126 as described with respect to FIG. 4.

If the magic word decode block 602 determines that the signal provided by the wakeup MMR control 126 is the retention magic word, the magic word decode block 602 provides a logical one signal, such as a pulse with a voltage corresponding to a high voltage rail, to a first input of the comparison logic 604. The tie-off magic word block 606 is a logic block, such as a set of logic gates, with inputs variously tied to a high voltage rail and a low voltage rail so that the tie-off magic word block 606 outputs the retention magic word during compliant function of the retention magic word load logic 402. The tie-off magic word verification block 608 is used to verify compliant function of the retention magic word load logic 402 by verifying that the tie-off magic word 606 properly outputs the retention magic word. If the tie-off magic word verification block 608 determines that the tie-off magic word block 606 outputs the retention magic word, the tie-off magic word verification block 608 provides a logical one signal, such as a pulse with a voltage corresponding to a high voltage rail, to a second input of the comparison logic 604.

If the first input and the second input of the comparison logic 604 are both logical one signals, the comparison logic 604 outputs a load pulse to the retention magic word latch 404. In response to the load pulse, the retention magic word latch 404 latches the retention magic word and outputs the retention magic word to the retention mode indicator logic 406. The retention mode indicator logic 406 compares its first input to its second input, and if they are equal, outputs the Retention Mode Indicator with a logical one value; otherwise, the retention mode indicator logic 406 outputs the Retention Mode Indicator with a logical zero value.

Figure 7:
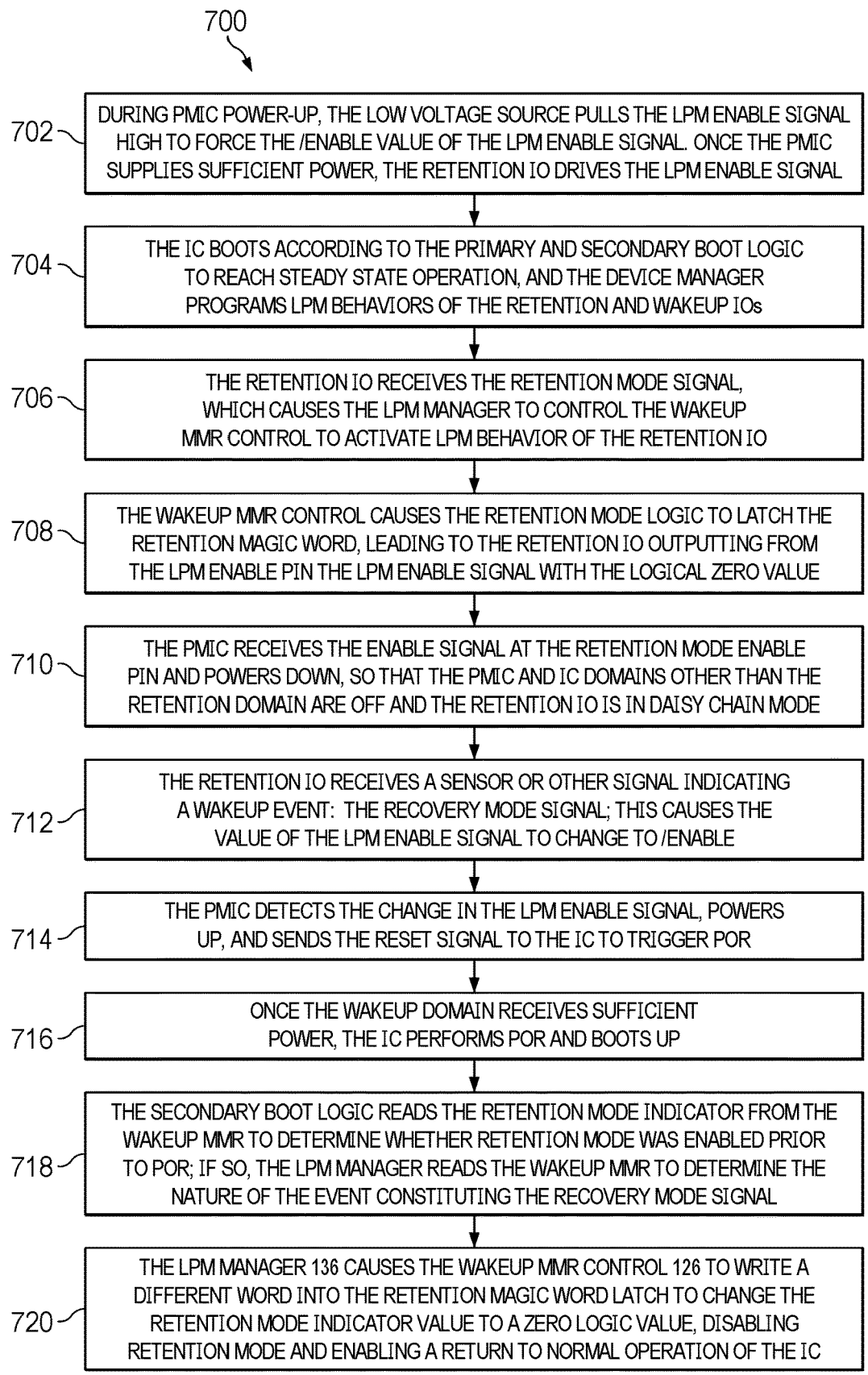
FIG. 7 is an example process for operating the IC of FIG. 1.

FIG. 7 is an example process 700 for operating the IC 102 of FIG. 1, including boot-up to normal operation, transitioning into retention mode, followed by return to normal operation. In step 702, during PMIC 202 power-up, the low voltage source 208 initially pulls the LPM Enable Signal high. This effectuates the default /ENABLE value of the LPM Enable Signal. Once the PMIC 202 supplies sufficient power, the retention IO 148 drives the LPM Enable Signal. In step 704, the IC 102 boots according to the primary boot logic 120, and then according to the secondary boot logic 138, to reach steady state operation. The boot process includes the device manager 136 programming LPM behaviors of the retention and wakeup IOs 148 and 128. In step 706, the retention IO 148 receives the asserted Retention Mode Signal, which causes the LPM manager 136 to control the wakeup MMR control 126 to activate LPM behavior of the retention IO 148.

In step 708, the wakeup MMR control 126 causes the retention mode logic 600 to latch the retention magic word, leading to the retention IO 148 outputting from the LPM enable pin 212 the LPM Enable Signal with the logical zero value. In step 710, the PMIC 202 receives at the retention mode enable pin 216 the LPM Enable Signal with the logical zero value (ENABLE) and powers down, so that the PMIC 202 and IC 102 domains other than the retention domain 112 are off and the retention IO 148 is in daisy chain mode. Accordingly, at this point, the IC 102 is in retention mode.

In step 712, the retention IO 148 receives a sensor or other signal indicating a wakeup event; in other words, the Recovery Mode Signal is asserted. The asserted Recovery Mode Signal ultimately causes the retention IO 148 to change the LPM Enable Signal to a logical one (/ENABLE). In step 714, the PMIC 202 detects the change in the LPM Enable Signal, powers up, and sends the Reset Signal to the IC 102 to trigger POR. In step 716, once the wakeup domain 106 receives sufficient power, the IC 102 performs POR and boots up. In step 718, the secondary boot logic 138 reads the Retention Mode Indicator from the wakeup MMR 152 to determine whether retention mode was enabled prior to POR. If so, the LPM manager 136 reads the wakeup MMR 152 to determine the nature of the event constituting the Recovery Mode Signal. In step 720, the LPM manager 136 causes the wakeup MMR control 126 to unlatch the retention magic word from (or write a different word into) the retention magic word latch 404 so that the retention mode indicator logic 406 outputs the Retention Mode Indicator with a zero logic value. This disables retention mode, enabling a return to normal operation of the IC 102. The zero logic value of the Retention Mode Indicator and the unlatch confirmation are also written into the wakeup MMR 152.

Figure 8A:
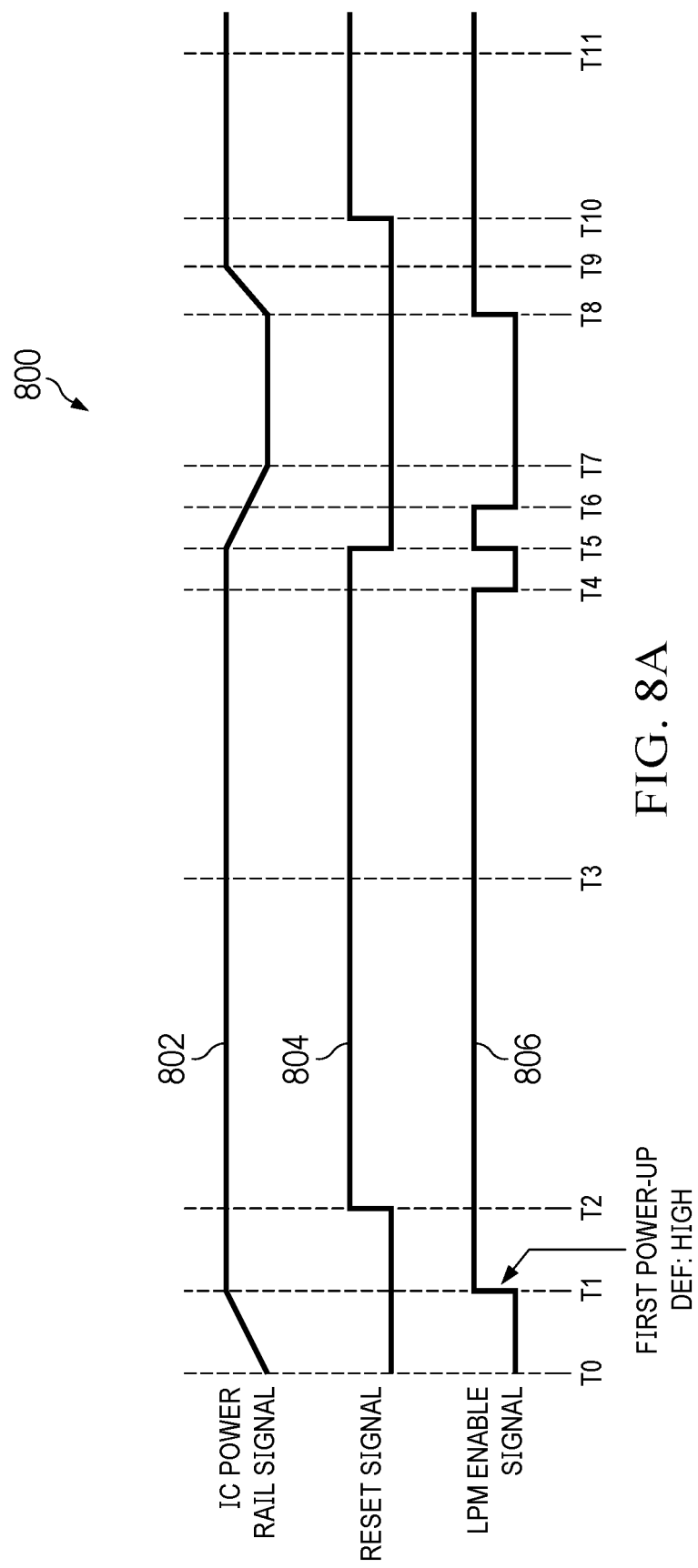
FIG. 8A is an example timing diagram for operating the IC of FIG. 1, including device power-up and entry into normal operation and transition into retention mode, followed by return to normal operation.

FIG. 8A is an example timing diagram 800 for operating the IC 102 of FIG. 1, including device power-up and entry into normal operation, transition into retention mode, followed by return to normal operation. The timing diagram shows an IC power rail signal 802, a Reset Signal 804, and the LPM Enable Signal 806. The Reset Signal 804 and the LPM Enable Signal 806 are each, respectively, asserted (have an ENABLE value) at a low voltage, and deasserted (have a /ENABLE value) at a high voltage.

At time T0, the PMIC 202 begins to power up to turn on. The IC 102 is unpowered, the LPM Enable Signal defaults to ENABLE, and the PMIC 202 drives the ENABLE value of the POR signal 804. Because the IC 102 is unpowered, the Reset Signal 804 does not yet trigger POR in the IC 102. At T1, the PMIC 202 is fully turned on, and the retention IO 148 drives the /ENABLE value of the LPM Enable Signal. The Reset Signal 804 remains asserted, and accordingly triggers a POR in the IC 102. At time T2, the PMIC 202 deasserts the Reset Signal 804. The ongoing boot process in the IC 102 continues. At or by time T3, the boot process of the IC 102 completes.

At time T4, the IC 102 enters retention mode. The retention IO 148 signals the PMIC 202 to power off by driving the LPM Enable Signal 806 with the ENABLE value. At time T5, the PMIC 202 detects the ENABLE value of the LPM Enable Signal 806, drives the Reset Signal 804 with the ENABLE value, and begins to power down. The PMIC 202 powering off powers down rails of the IC 102 dependent on main power. The PMIC 202 also starts the ignore period, that is, it suppresses sampling of the LPM Enable Signal 806. The asserted Reset Signal 804 causes the IC 102 to begin a POR, resetting the LPM Enable Factor signal to its default /ENABLE (high) value. This causes the LPM Enable Signal 806 to reset to its default /ENABLE (high) value. Between times T5 and T6, the PMIC 202 continues to ignore the /ENABLE value of the LPM Enable Signal 806. At time T6, the IC power rail signal 802 falls below the threshold, enabling the pull-down of the second isolation circuit 116 to pull the LPM Enable Factor signal back down to the ENABLE value. This causes the LPM Enable Signal 806 to return to the ENABLE value.

At time T7, the PMIC 202 finishes powering down. Between times T7 and T8, the IC 102 continues to operate in retention mode and the PMIC 202 remains powered down. The PMIC 202 continues to ignore the LPM Enable Signal 806 for an amount of time after the PMIC 202 fully powers down; after this time has elapsed, the PMIC 202 resumes sampling the LPM Enable Signal 806. At time T8, the retention IO 148 detects the Recovery Mode Signal (an event triggering wakeup), resulting in the retention IO 148 driving the /ENABLE value of the LPM Enable Signal 806. The PMIC 202 receives the /ENABLE value of the LPM Enable Signal 806, and begins to power up. The PMIC 202 powers up prior to driving the Reset Signal 804 with the ENABLE value so that the IC 102 will have sufficient power to perform a stable POR.

At time T9, the PMIC 202 completes its power up sequence. At time T10, the PMIC 202 drives the Reset Signal 804 with the ENABLE value. The wakeup IO 128 receives the Reset Signal 804 with the ENABLE value, causing the IC 102 to perform a POR. At time T11, the IC 102 completes the boot process and returns to normal, steady state operation. Accordingly, in some examples, time T11 corresponds to a return to the IC 102 function at time T3.

FIG. 8B is an example timing diagram 808 for operating the IC 102 of FIG. 1, including device power-up and entry into normal operation, transitioning into sleep mode, followed by return to normal operation. Times T0, T1, T2, and T3 are as described with respect to FIG. 8A. At time T4, the IC 102 enters sleep mode. The IC 102 saves state data to the wakeup MMR 152, and the LPM Enable Signal 806 is driven with the ENABLE value. The ENABLE value of the LPM Enable Signal 806 causes the PMIC 202 to provide less total power to the IC 102. However, rails of the IC 102 that remain active during sleep mode—that is, power rails in the wakeup domain 106, the device manager domain 108, and the retention domain 148—remain fully powered. Accordingly, the IC power rail signal 802 does not change during sleep mode operation. At time T5, an event triggering wakeup occurs, either within the wakeup or device manager domains 106 or 108 or corresponding to a signal received by the wakeup IO 128. This causes the LPM Enable Signal 806 to be driven with the /ENABLE value, which causes the PMIC 202 to return to full power. Following time T5, the IC 102 recovers from sleep mode, including by reloading state data saved in the wakeup MMR 152. At time T6, the IC 102 returns to normal, steady state operation.

Modifications are possible in the described examples, and other examples are possible within the scope of the claims.

In some examples, a PMIC is configured to accept only one of a sleep mode input or a retention mode input.

In some examples, the IC 102 enables LPMs other than or in addition to retention mode or sleep mode via the LPM enable pin 218.

In some examples, the IC 102 controls more than two LPMs via the LPM enable pin 218.

In some examples, the IC 102 does not provide the Multiplexer Control Signal (see FIG. 5), or a corresponding signal indicating LPM type selection, to any pin of the IC 102.

In some examples, a voltage of the threshold below which the pull-down pulls the LPM Enable Factor signal down to the ENABLE value is higher than a voltage corresponding to the ENABLE value of the LPM Enable Factor signal.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor shown and described herein as a single component may instead be multiple resistors coupled in parallel between the same nodes. For example, a resistor shown and described herein as a single component may instead be multiple resistors coupled in series between the same two nodes as the single resistor.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

While certain elements of the described examples may be included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

What is claimed is:

1. An integrated circuit (IC) comprising:
a first control block including an output, the first control block configured to provide a first low power mode (LPM) control signal that indicates a first LPM;
a second control block including a first output and a second output, the second control block configured to provide, at the first output, a second LPM control signal that indicates a second LPM that is different from the first LPM;
a multiplexer including a first input, a second input, a control input, and an output, the first input of the multiplexer coupled to the output of the first control block, the second input of the multiplexer coupled to the first output of the second control block, and the control input coupled to the second output of the second control block; and
an input/output (IO) block including an input and a physical connector adapted to be coupled to a device external to the IC, the input of the IO block coupled to the output of the multiplexer, and the IO block configured to provide a signal at the physical connector in response to the input of the IO block.

2. The IC of claim 1, wherein the IC is configured to enter the first LPM if the first LPM control signal has an ENABLE value, and the IC is configured to enter the second LPM if the second LPM control signal has an ENABLE value.

3. The IC of claim 1,
wherein the IC includes multiple physical connectors; and
wherein the IC is configured not to provide a signal corresponding to the multiplexer control signal at the physical connectors of the IC.

4. The IC of claim 1,
wherein the IO block is configured to operate in a daisy chain mode while the IC operates in a first one of the first and second LPMs; and
wherein the IO block is configured to operate in a normal mode while the IC operates in a second one of the first and second LPMs.

5. The IC of claim 1,
wherein the IO block is configured to operate using power from a power management IC while the IC operates in a first one of the first and second LPMs; and
wherein the IO block is configured to operate using power from an external power source other than the power management IC while the IC operates in a second one of the first and second LPMs.

6. The IC of claim 1,
wherein the IC includes multiple voltage domains;
wherein a first set of the voltage domains is configured to be powered off during a first one of the first and second LPMs; and
wherein a second set of the voltage domains is configured to be powered off during a second one of the first and second LPMs, so that the first set is different from and includes the second set.

7. The IC of claim 1, wherein a first one of the first and second power levels corresponds to a reduced power level received from a power management IC, and a second one of the first and second power levels is a zero power level received from the power management IC.

8. An integrated circuit (IC) comprising:
an isolation including a level shift with pull-down, the pull-down configured to weakly pull down the voltage of signals that travel through the isolation;
an input/output (IO) block including an input and a physical connector adapted to be coupled to a device external to the IC, the IO block configured to provide an LPM enable signal to the physical connector in response to the input of the IO block; and
a low power mode (LPM) control logic including an output, the output of the LPM control logic coupled via the isolation to the input of the IO block, the LPM control logic configured to provide a relatively high voltage signal to the output of the LPM control logic as a default during a power on reset (POR) of the IC;
wherein the pull-down is configured to pull the voltage of the LPM enable signal to the relatively low voltage in response to a voltage of the LPM enable signal falling below a threshold.

9. The IC of claim 8, wherein the IO block is configured to provide the LPM enable signal with a /ENABLE value in response to the input of the IO block having a relatively high voltage, and to provide the LPM enable signal with an ENABLE value in response to the input of the IO block having a relatively low voltage.

10. The IC of claim 9, wherein a voltage of the threshold is higher than the relatively low voltage.

11. The IC of claim 8,
wherein the physical connector of the IC is adapted to be coupled to a physical connector of a main power source of the IC that is external to the IC;
wherein the isolation is adapted to be coupled to a power output of the main power source; and wherein the isolation is adapted to be coupled to a power output of another power source that is external to the IC.

12. The IC of claim 8, wherein the IO block includes an output, the IC further including:
an LPM indicator logic including an output;
an AND logic gate including first and second inputs and an output, the first input of the AND logic gate coupled to the output of the LPM indicator logic, and the second input of the AND logic gate coupled to the output of the IO block; and
an OR logic gate including first and second inputs and an output, the first input of the OR logic gate coupled to the output of the LPM control logic via the isolation, and the second input of the OR logic gate coupled to the output of the AND logic gate.

13. The IC of claim 12, wherein the LPM control logic includes an input coupled to the output of the IO block.

14. A system comprising:
a power management integrated circuit (PMIC) including a including an input, a reset output, and a power output;
a power source including an output; and
an IC including:
a main power input coupled to the power output of the PMIC;
an LPM power input coupled to the power output of the power source;
a reset input coupled to the reset output, the IC configured to perform a power on reset (POR) in response to the reset input being asserted;
an isolation including a first power input, a second power input, and a level shift with pull-down, the first power input of the isolation coupled to the main power input, the second power input of the isolation coupled to the LPM power input, and the pull-down configured to weakly pull down the voltage of signals that travel through the isolation;
an input/output (IO) block including an input and an output, the output of the IO block coupled to the input of the PMIC, the IO block configured to provide an LPM enable signal to the output of the IO block in response to the input of the IO block; and
a low power mode (LPM) control logic including an output, the output of the LPM control logic coupled via the isolation to the input of the IO block, the LPM control logic configured to provide a relatively high voltage signal to the output of the LPM control logic as a default during a power on reset (POR) of the IC;
wherein the pull-down is configured to pull the voltage of the LPM enable signal to the relatively low voltage in response to a voltage of the LPM enable signal falling below a threshold.

15. The system of claim 14, wherein the IO block is configured to provide the LPM enable signal with a/EN-ABLE value in response to the input of the IO block having a relatively high voltage, and to provide the LPM enable signal with an ENABLE value in response to the input of the IO block having a relatively low voltage.

16. The system of claim 14, wherein a voltage of the threshold is higher than the relatively low voltage.

17. The system of claim 14, wherein the output of the IO block is a first output of the IO block, and the IO block includes a second output, the IC further including:
an LPM indicator logic including an output;
an AND logic gate including first and second inputs and an output, the first input of the AND logic gate coupled to the output of the LPM indicator logic, and the second input of the AND logic gate coupled to the second output of the IO block; and
an OR logic gate including first and second inputs and an output, the first input of the OR logic gate coupled to the output of the LPM control logic via the isolation, and the second input of the OR logic gate coupled to the output of the AND logic gate.

18. The system of claim 17, wherein the LPM control logic includes an input coupled to the second output of the IO block.

19. The system of claim 14, wherein the PMIC is configured to power on or power off in response to the input of the PMIC.

20. The system of claim 19, wherein the PMIC is configured to provide at the reset output of the PMIC a signal to trigger POR of the IC in response to receiving at the input of the PMIC a signal causing power off of the PMIC.

* * * * *